(12) United States Patent
Alabraba et al.

(10) Patent No.: US 7,290,149 B2
(45) Date of Patent: Oct. 30, 2007

(54) VERBOSE HARDWARE IDENTIFICATION FOR BINDING A SOFTWARE PACKAGE TO A COMPUTER SYSTEM HAVING TOLERANCE FOR HARDWARE CHANGES

(75) Inventors: Ferdinand Jay Alabraba, Seattle, WA (US); Aidan T. Hughes, Bellevue, WA (US); Caglar Gunyakti, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 10/378,346

(22) Filed: Mar. 3, 2003

(65) Prior Publication Data
US 2004/0177168 A1    Sep. 9, 2004

(51) Int. Cl.
*G06F 21/00* (2006.01)
(52) U.S. Cl. .................................... 713/189
(58) Field of Classification Search ............... 705/55, 705/56; 713/189, 194
See application file for complete search history.

(56) References Cited

U.S. PATENT DOCUMENTS

| | | | |
|---|---|---|---|
| 4,688,169 A | 8/1987 | Joshi | 364/200 |
| 6,044,471 A | 3/2000 | Colvin | 713/202 |
| 6,148,407 A | 11/2000 | Aucsmith | 713/202 |
| 6,226,747 B1 | 5/2001 | Larsson et al. | 713/200 |
| 6,243,468 B1 | 6/2001 | Pearce et al. | 380/250 |
| 6,785,825 B2 | 8/2004 | Colvin | 713/202 |
| 6,792,113 B1* | 9/2004 | Ansell et al. | 380/284 |
| 6,931,545 B1* | 8/2005 | Ta et al. | 726/10 |
| 6,952,770 B1* | 10/2005 | Mittal et al. | 713/168 |
| 7,051,200 B1* | 5/2006 | Manferdelli et al. | 713/153 |
| 2001/0044782 A1 | 11/2001 | Hughes et al. | 705/59 |
| 2003/0061488 A1* | 3/2003 | Huebler et al. | 713/176 |
| 2003/0074563 A1* | 4/2003 | Spacey | 713/181 |
| 2004/0133792 A1* | 7/2004 | Dublish et al. | 713/193 |

FOREIGN PATENT DOCUMENTS

| | | |
|---|---|---|
| EP | 0 679 980 A1 | 11/1995 |
| EP | 0 707 270 A2 | 4/1996 |

* cited by examiner

*Primary Examiner*—Matthew B Smithers
(74) *Attorney, Agent, or Firm*—Merchant & Gould P.C.

(57) ABSTRACT

Systems and methods for generating a verbose hardware identification (VHWID) for a given computer system are disclosed. The verbose hardware identification (VHWID) may be used to control the use of software on the given computer system depending on the degree of hardware changes to the computer system.

45 Claims, 7 Drawing Sheets

VERBOSE HARDWARE IDENTIFICATION FOR BINDING A SOFTWARE PACKAGE TO A COMPUTER SYSTEM HAVING TOLERANCE FOR HARDWARE CHANGES

FIELD OF THE INVENTION

The present invention relates to systems and methods for generating a verbose hardware identification (VHWID) for a given computer system. The verbose hardware identification (VHWID) may be used to control the use of software on the given computer system depending on the degree of hardware changes to the computer system.

BACKGROUND OF THE INVENTION

There has been considerable effort in recent years to prevent or minimize the unlawful use of computer software. Due to its reproducibility and ease of distribution, piracy of computer software and illegal use of computer software beyond the scope of a license agreement are common occurrences, which significantly hurt software manufacturers.

Methods have been developed in an effort to reduce the occurrences of computer software piracy and illegal use of computer software beyond the scope of a license agreement. However, such methods often cause problems for legitimate software purchasers and users in the form of consumer inconvenience. For instance, a user who has upgraded his/her computer should be able to legitimately reinstall the software product on the upgraded machine. However, presently available methods may either (i) not allow the software to be installed, or (ii) force the user (who is now disgruntled) to call the software manufacturer for assistance.

Accordingly, there remains a need for improved technology solutions to piracy and illicit use, but which also recognize and accommodate the needs and practices of a legitimate software purchaser and user.

SUMMARY OF THE INVENTION

The present invention addresses some of the difficulties and problems discussed above by the discovery of an improved hardware identification for a computer system. The hardware identification of the present invention provides a method of minimizing or preventing software piracy and the illegal use of computer software beyond the scope of a license agreement, while allowing for machine upgrades by legitimate software users.

The hardware identification of the present invention, referred to herein as a "verbose hardware identification" (VHWID), identifies (1) a number of component classes typically used to build a hardware configuration for a computer system, and (2) each component device or instance within a given component class for a particular computer system. By taking into account each component device or instance within a select number of component class, a secure and reliable verbose hardware identification (VHWID) for a particular computer system is generated, while enabling a degree of tolerance for component changes to the hardware configuration of the particular computer system.

The verbose hardware identification (VHWID) may be used to identify a particular hardware configuration when initially loading a software product onto a computer. The verbose hardware identification (VHWID) may be stored for future use, such as (i) when the same software product is launched on the same computer or a variation of the same computer, or (ii) when the same software product is reloaded onto a variation of the same computer or a completely different computer. For example, when the same software product is launched on the same computer or a variation of the same computer, a second verbose hardware identification (sVHWID) is generated and compared to the initial verbose hardware identification (iVHWID). If a desired number of matches exist between component classes of the second verbose hardware identification (sVHWID) and component classes of the initial verbose hardware identification (iVHWID), the method of the present invention allows the software product to be launched. However, if a desired number of matches do not exist between component classes of the second verbose hardware identification (sVHWID) and component classes of the initial verbose hardware identification (iVHWID), the method of the present invention will not allow the software product to be launched due to changes to the original hardware system beyond a desired threshold.

Accordingly, the present invention is directed to a verbose hardware identification (VHWID), and a method of generating a verbose hardware identification (VHWID). The present invention is further directed to a method for preventing the use of software on a computer system if an attempt to launch the software product generates a new verbose hardware identification (VHWID), which is out of tolerance when compared to an original verbose hardware identification (VHWID) due to one or more hardware changes to the original computer system.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to a method for identifying a hardware configuration of a given computer system by a verbose hardware identification (VHWID). The present invention is also directed to a method of generating a verbose hardware identification (VHWID) by identifying all of the component instances within a selected number of component classes. The present invention is further directed to a method of using a verbose hardware identification (VHWID) to determine whether a software product can be used on a computer hardware configuration.

The verbose hardware identification (VHWID) may be generated for a computer system comprising a variety of hardware components. An exemplary computer system may comprise a number of hardware components, which are grouped into classes including, but not limited to, hard disk drives, optical disk drives network cards, display adapters, read only memory (ROM), random access memory (RAM), and a basic input/output system (BIOS). An exemplary computer system and exemplary operating environment for practicing the present invention is described below.

Exemplary Operating Environment

Figure 1:
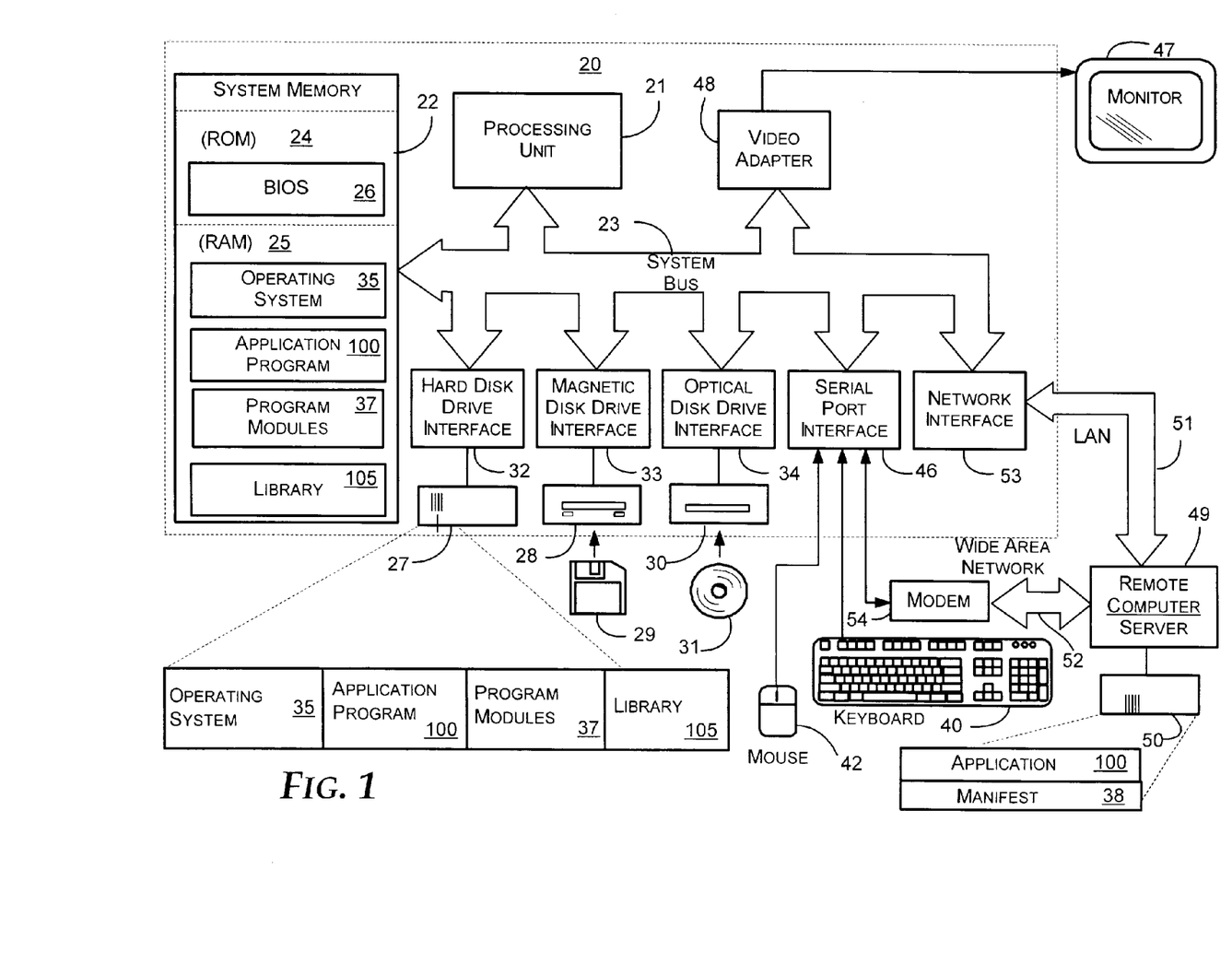
FIG. 1 is a flow diagram of some of the primary components of an exemplary operating environment for implementation of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media, which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20.

For example, one or more data files 60 (not shown) may be stored in the RAM 25 and/or hard drive 27 of the personal computer 20.

A number of program modules may be stored on hard disk 27, magnetic disk 29, optical disk 31, ROM 24, or RAM 25, including an operating system 35, an application program module 36, other program modules 37, and program data 38. Program modules include, but are not limited to, routines, sub-routines, programs, objects, components, data structures, etc., which perform particular tasks or implement particular abstract data types. Aspects of the present invention may be implemented as an integral part of an application program module 36 or as a part of another program module 37.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A monitor 47 or other type of display device may also be connected to system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to personal computer 20, only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, personal computer 20 is connected to local area network 51 through a network interface or adapter 53. When used in a WAN networking environment, personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The present invention may also be practiced in distributed computing environments, where tasks are performed by remote processing devices that are linked through a communications network. In a distributed computing environment, program modules may be located in both local and remote memory storage devices.

Implementation of Exemplary Embodiments of the Present Invention

As described above, a computer system typically comprises multiple classes of hardware components. Further, the computer system may comprise multiple components (e.g., two disk hard drives) within each class of hardware components.

The verbose hardware identification (VHWID) of the present invention takes into account each component device (also referred to herein as each "instance") within each desired class of hardware components used to determine the VHWID. The verbose hardware identification (VHWID) of the present invention may also take into account the absence of a component device within a given component class of a computer hardware system. For example, a determination of the component classes to be used to identify a given computer hardware configuration may be made prior to examining the given computer hardware configuration. The computer hardware configuration may or may not contain a component instance for each of the selected component classes used to produce the verbose hardware identification (VHWID) of the computer hardware configuration.

An exemplary method of the present invention for generating a verbose hardware identification (VHWID) is given below. Further, an exemplary method of the present invention for using the verbose hardware identification (VHWID) as an anti-pirating tool is also described below.

I. Generating a Verbose Hardware Identification (VHWID) for a Computer System

A description of the components of an exemplary verbose hardware identification (VHWID) is given below.

A. The Verbose Hardware Identification (VHWID)

The verbose hardware identification (VHWID) of a given computer system desirably comprises three parts: (1) a header component, (2) a count component, and (3) a hash component. Each of the possible verbose hardware identification (VHWID) parts may be derived from the hardware configuration of a given computer system. An example of a computer hardware configuration and the instances within each component class is shown in FIG. 2.

Figure 2:
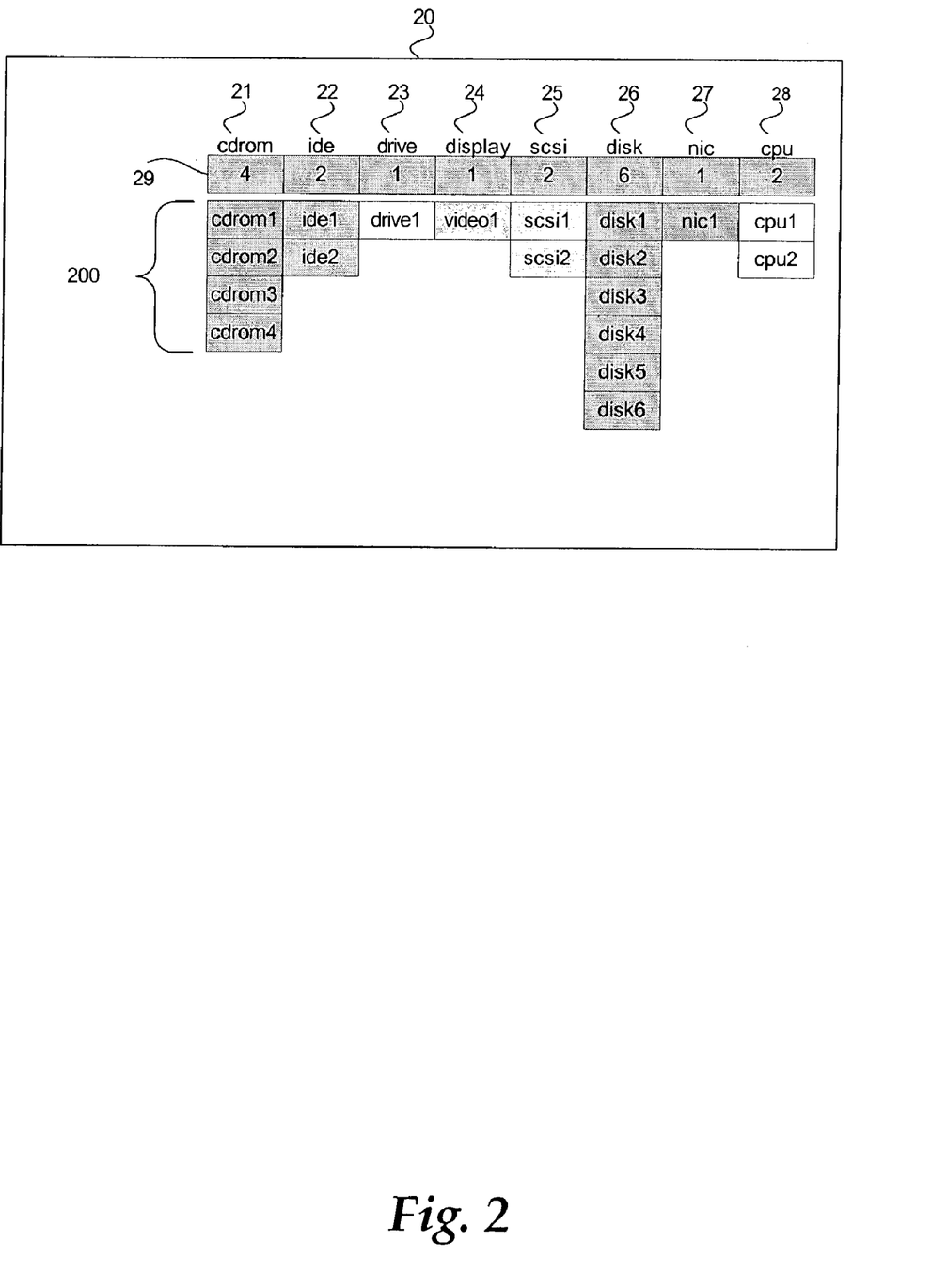
FIG. 2 depicts an exemplary hardware configuration containing eight component classes and a total of 19 component devices or instances distributed within the eight component classes.

As shown in FIG. 2, the exemplary computer hardware configuration 20 comprises eight distinct component classes 21-28 having a total of 19 component instances 200 distributed among component classes 21-28. CDRom component class 21 contains four component instances; IDE component class 22 contains two component instances; drive component class 23 contains one component instance; display component class 24 contains one component instance; SCSI component class 25 contains two component instances; disk component class 26 contains six component instances; network card component class 27 contains one component instance; and processor (i.e., cpu) component class 28 contains two component instances. Row 29 in FIG. 2 depicts a string of numbers, which represent the number of component instances within each of the eight component classes 21-28.

It should be noted that the number of component instances within a given component class may vary from zero to as many as required to represent a given hardware configuration, although an implementation may arbitrarily limit the number of component instances per component class. Typically, a given hardware configuration contains from zero to about six component instances per component class. As described below, even when a component class does not contain a component instance, the absence of a component instance within the component class contributes a piece of information, which is incorporated into the verbose hardware identification (VHWID).

Figure 3:
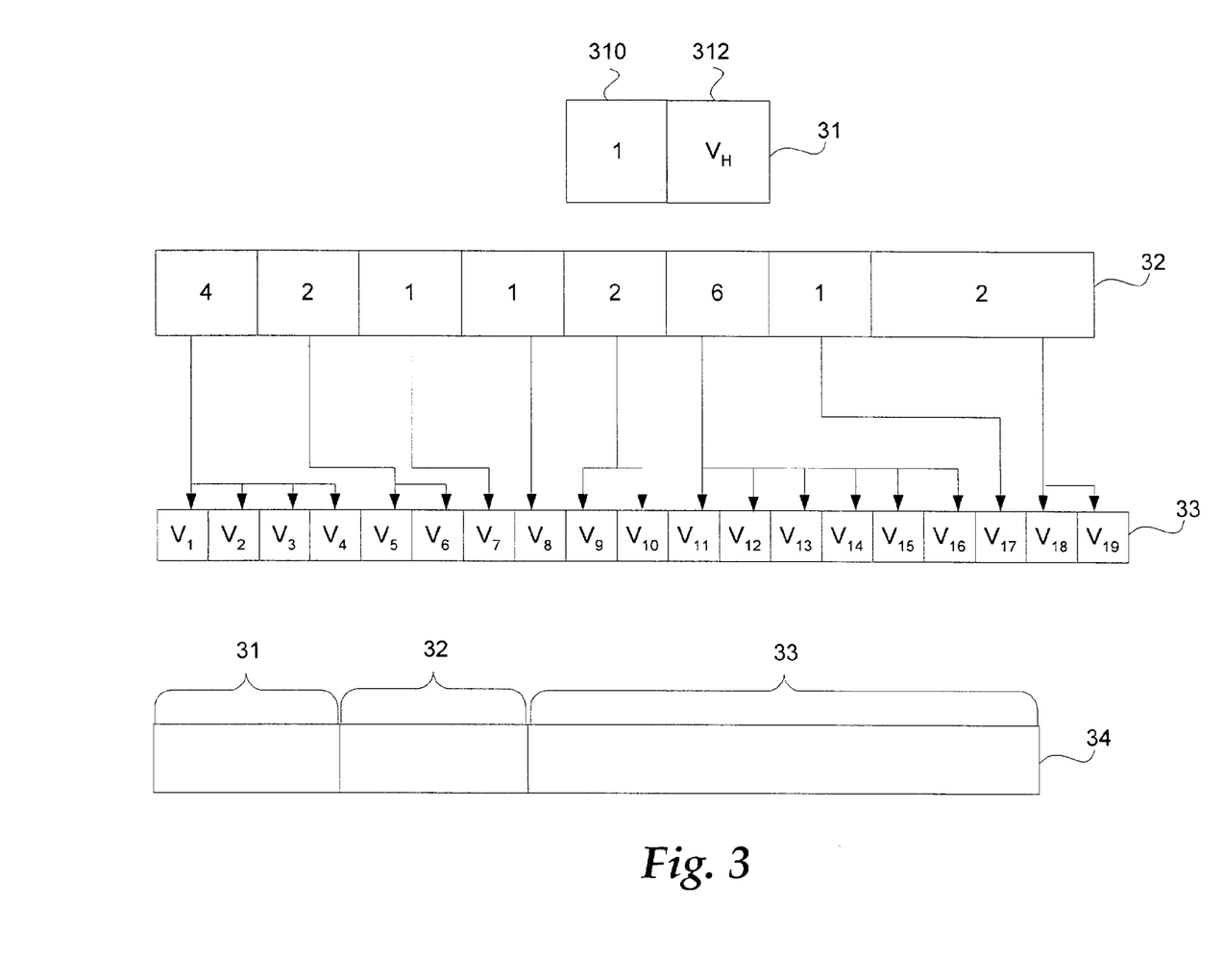
FIG. 3 depicts one possible verbose hardware identification (VHWID) for the exemplary hardware configuration shown in FIG. 2.

An exemplary verbose hardware identification (VHWID) is shown in FIG. 3. The exemplary verbose hardware identification (VHWID) 33 of FIG. 3 is one possible way to identify the computer hardware configuration shown in FIG. 2. As discussed above, the verbose hardware identification (VHWID) 34 desirably comprises at least three separate parts: header portion 31, count portion 32, and hash portion 33. Each of the three separate parts of verbose hardware identification (VHWID) 34 is depicted in FIG. 3. Header portion 31 desirably comprises a version component 310, and a truncated numerical portion 312.

Version component 310 of header portion 31 identifies a particular version of the verbose hardware identification (VHWID) 34 used to identify a given computer system. For example, a particular version (e.g., version "1") of a verbose hardware identification (VHWID) may vary from another version (e.g., version "2") of a verbose hardware identification (VHWID) by using one set of parameters to create version 1, while using a separate, different set of parameters to create version 2. A variety of parameters may be used to create a given version of a verbose hardware identification (VHWID). Suitable parameters include, but are not limited to, (1) the number of component classes represented in the header portion 31 of the verbose hardware identification (VHWID) 34; (2) whether the identification string for one or more component instances used to form the header portion 31 are subjected to a hash function or some other data process (e.g., truncating the identification string); (3) the maximum and/or minimum number of component classes used to create the verbose hardware identification (VHWID) 34; (4) the maximum and/or minimum number of component instances to be considered within a given component class; (5) the hash function used to produce hash values for each component instance; (6) the length of each hash result used to form the verbose hardware identification (VHWID) 34; and (7) the total and/or maximum length of the verbose hardware identification (VHWID) 34.

Some component classes cannot have multiple component instances and are known as single-instance classes. Total system RAM is one example of a single-instance class. The data for a single-instance class is hashed and truncated if necessary, then stored in the truncated numerical portion 312 of the header part 31. Each single-instance class represented in the header will have an associated truncated numerical portion 312.

Desirably, header part 31 of verbose hardware identification (VHWID) 34 has a fixed length, which is consistent for all verbose hardware identifications having a particular version type (e.g., version 1 VHWIDs). For example, header part 31 of verbose hardware identification (VHWID) 34 may have a fixed length of from about 10 to about 24 bytes with the total number of bytes distributed among version component 310 and truncated numerical portion 312.

Count portion 32 comprises a string of numbers, which represent the number of component instances within each of the component classes used to prepare the verbose hardware identification (VHWID) 34. As shown in FIG. 3, count portion 32 comprises the string of numbers: "4 2 1 1 2 6 1 2", which corresponds to the component instances within component classes 21-28 shown in FIG. 2. It should be noted that if a component class does not contain a component instance, count portion 32 contains a "0" for the particular component class.

Like header part 31 described above, it is desirable for count portion 32 of verbose hardware identification (VH- WID) 34 to have a fixed length, which is consistent for all verbose hardware identifications having a particular version type. Count portion 32 always has a length equal to n, the number of component classes used to create verbose hardware identification (VHWID) 34. Typically, count portion 32 of verbose hardware identification (VHWID) 34 has a fixed length of from about 6 to about 16 characters.

Hash portion 33 comprises a concatenated string of hash values representing each of the 19 component instances within component classes 21-28 shown in FIG. 2. Each separate hash result may have a length of up to about 160 bits. Desirably, each separate hash result has a length of from about 10 to about 20 bits, more desirably, about 16 bits. In this example, the resulting hash portion 33 of verbose hardware identification (VHWID) 34 has a desired total length of 304 bits (i.e., 19×16=304).

Hash portion 33 of verbose hardware identification (VHWID) 34 typically has a length, which varies depending upon the number of component instances within n component classes of a given hardware configuration. The total length of hash portion 33 is equal to the number of component instances times the desired hash result length for each component instance hash result.

As shown in FIG. 3, verbose hardware identification (VHWID) 34 is represented by a concatenated string of header part 31, count part 32 and hash part 33. An exemplary method of determining a verbose hardware identification (VHWID) 34 for a computer hardware configuration is described below.

It should be noted that the verbose hardware identification (VHWID) of the present invention may only comprise one part. In one exemplary embodiment of the present invention, the verbose hardware identification (VHWID) of a given computer hardware configuration comprises hash part 33 alone. In this embodiment, the verbose hardware identification (VHWID) does not contain header part 31 or count part 32. In a further embodiment of the present invention, verbose hardware identification (VHWID) comprises only count part 32 in combination with hash part 33. In another embodiment of the present invention, verbose hardware identification (VHWID) comprises only header part 31 and hash part 33, constructed such that count part 32 is implicit.

B. Determining a Verbose Hardware Identification (VHWID) for a Computer System

Figure 4:
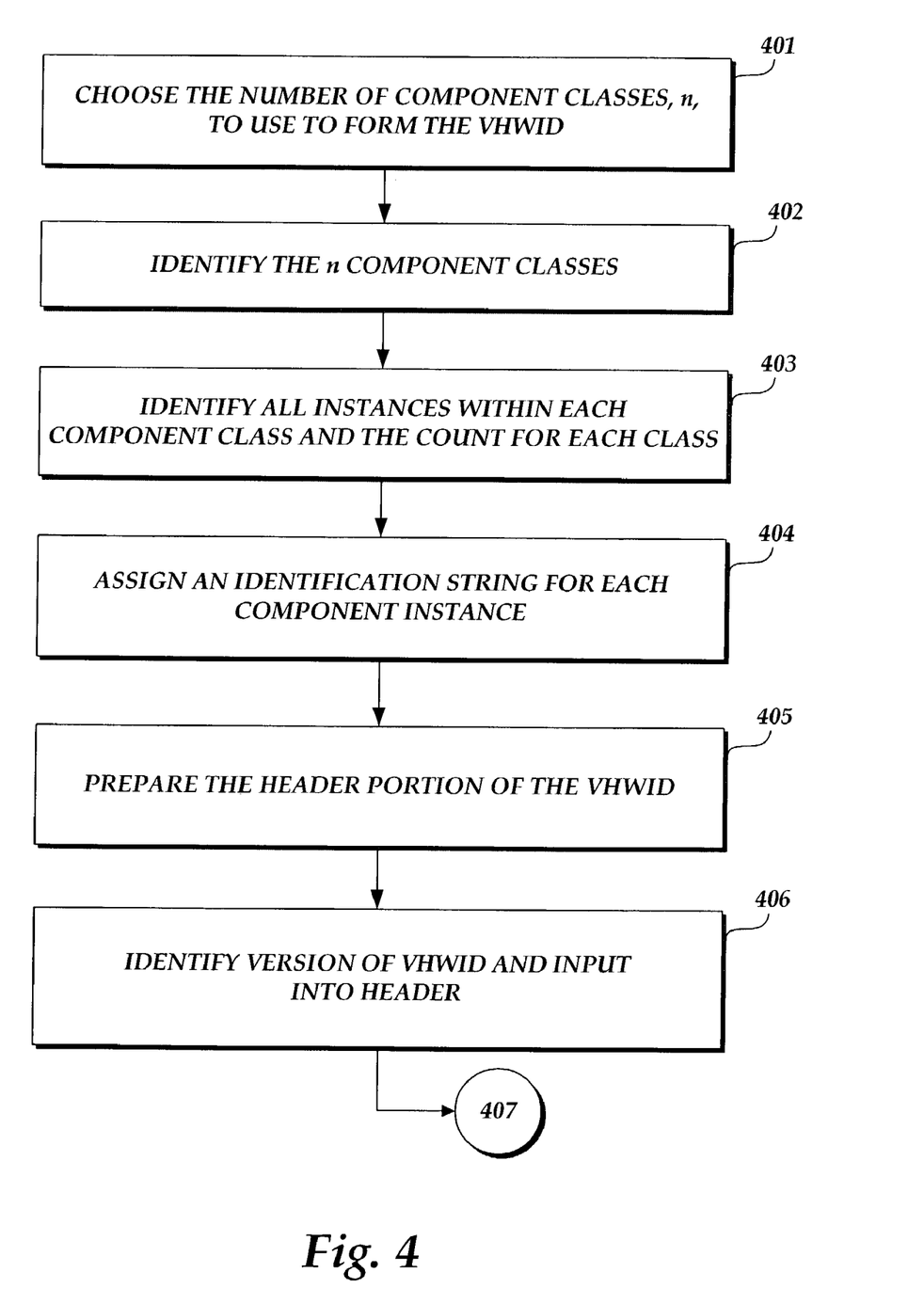
FIGS. 4-6 are a flow diagram showing exemplary steps in determining a verbose hardware identification (VHWID) for a hardware configuration.
Figure 5:
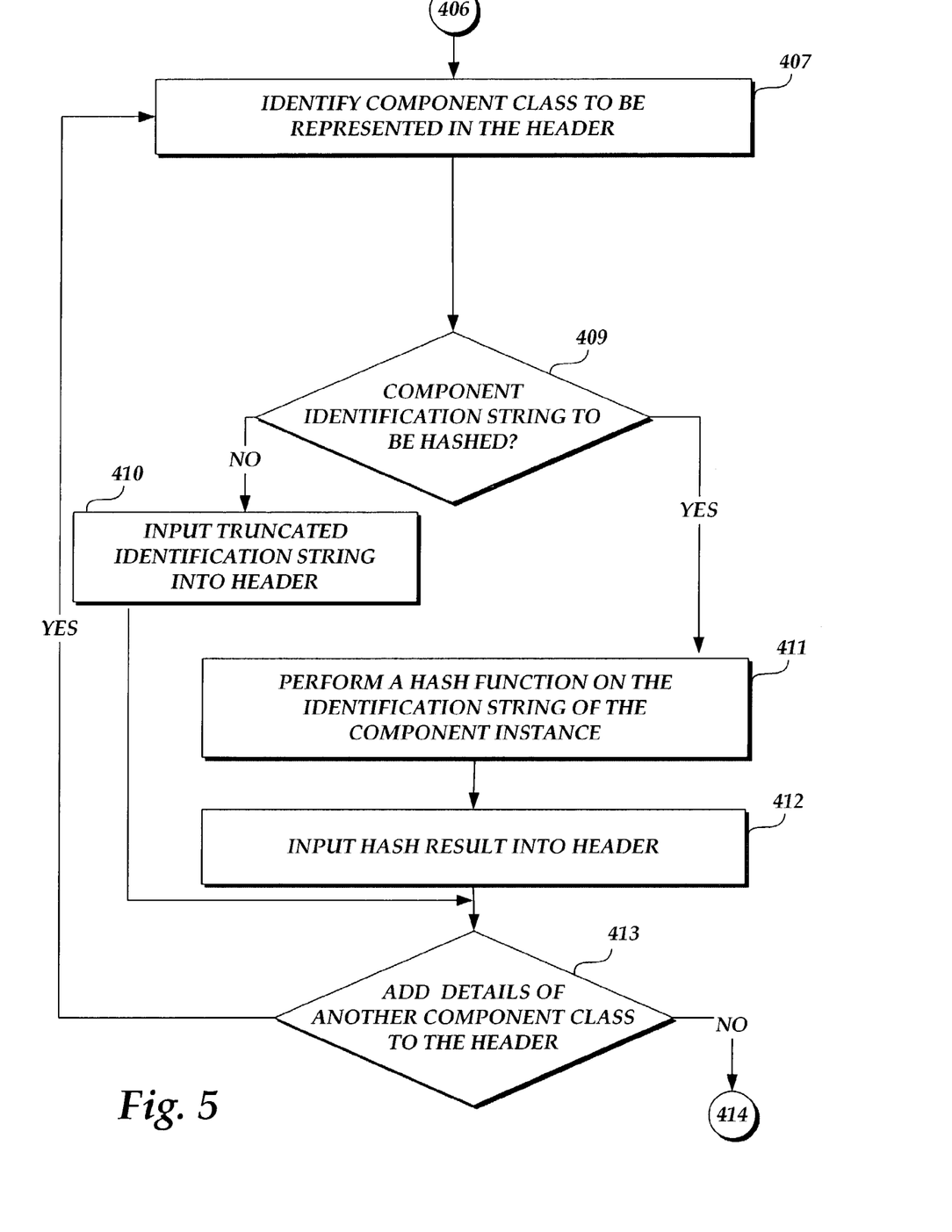
Figure 6:
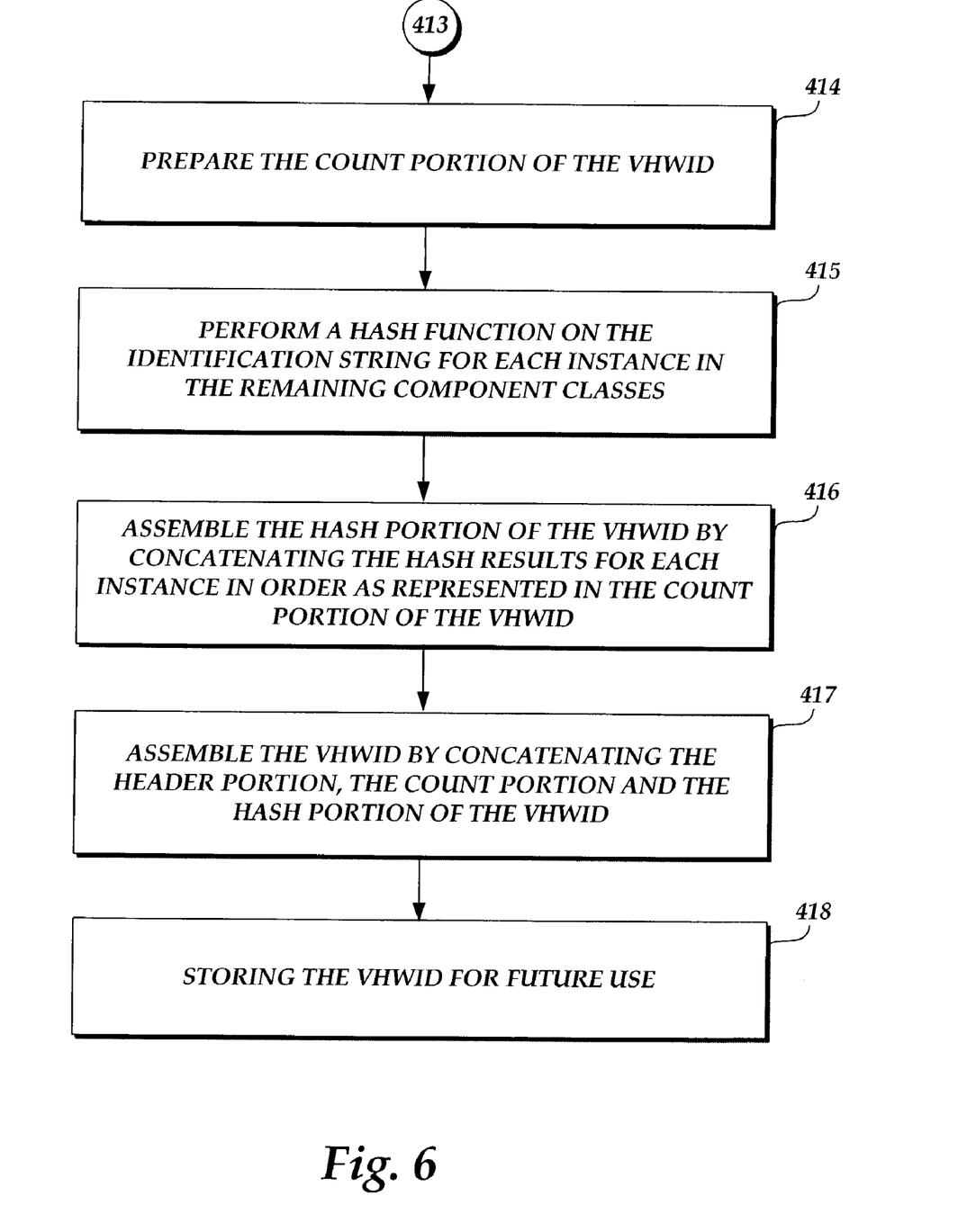

The VHWID of the present invention may be determined by an exemplary method as shown in FIGS. 4-6. The steps of the exemplary method may be performed by software code within a software product on a customer's computer, similar to computer 20 described above with reference to FIG. 1. As shown in FIGS. 4-6, an exemplary determination of a VHWID for a given computer hardware configuration (referred to herein as "HW1") begins with step 401, wherein a number of component classes, n, is chosen to identify a given computer hardware configuration HW1. As discussed above, a given computer system may include a variety of hardware components and classes of hardware components. Exemplary hardware component classes include, but are not limited to, disk hard drives, logical disk partitions, optical disks, network cards, display adapters, read only memory (ROM), random access memory (RAM), IDE devices, sound cards, video cards, processors, SCSI devices and the system BIOS. Desirably, n, the number of hardware component classes, is a whole number ranging from about 2 to about 16. In general, it is desirable for n to be as large as possible in order (i) to more precisely identify a given computer system, and (ii) to more accurately measure the degree of tolerance of a given computer system.

After choosing the number of component classes, n, in step 401, each component class is identified in step 402. The component classes may include any of the above-described component classes such as the class of disk hard drives. An exemplary list of component classes used to identify sample hardware configuration HW1 is given below in Table 1.

TABLE 1

Exemplary List of Hardware Component Classes Used To Identify Sample Hardware Configuration HW1

| Component Class No. | Class Description | Class Identifier |
|---|---|---|
| 1 | CdRom | CdRom device identifier |
| 2 | IDE devices | IDE device identifier |
| 3 | Hard Disk Drive | Drive partition serial number |
| 4 | Display adapter device | Identifier |
| 5 | SCSI devices | SCSI device identifier |
| 6 | Disk Devices | Disk device identifier |
| 7 | Network Card | MAC address |
| 8 | Processors | Processor device identifier |

As shown in Table 1, in this example, n equals 8, and the identified hardware component classes include: (1) a CdRom class; (2) an IDE devices class; (3) a drive class; (4) a display adapter device class; (5) a SCSI device class; (6) a disk class; (7) a network card class; and (8) a CPU processor class.

After each component class is identified in step 402, all devices or instances within each hardware component class are identified in step 403. The "count" (i.e., the number of component devices or instances within each component class) is also determined in step 403. Desirably, each instance within a particular component class is identified by the most unique identification string associated with the instance. For example, the hardware configuration may contain a CdRom manufactured by NEC Corporation and having an identification string of "NEC CDRW24 S15." Any available method for determining the most unique identification string of a given instance may be used in the present invention. The step of assigning an identification string for each component instance is shown in step 404.

Once an identification string for each component instance is assigned, the header portion of the verbose hardware identification (VHWID) is prepared in step 405. In step 406, a particular version of the VHWID is inputted into the header to form header portion 310 as shown in FIG. 3. As described above, the version number may represent one or more parameters used to determine the verbose hardware identification (VHWID).

In step 407, a component class to be represented in the header is identified. Typically, component classes capable of having only a single component instance, or single instance classes, are represented in the header portion of the VHWID. Suitable component classes, which may be represented in the header portion of the VHWID, included, but are not limited to, a memory component class, a computer dockability component class (i.e., whether the computer is dockable or not), the system BIOS, or a combination thereof. In one exemplary embodiment of the present invention, the header portion of the VHWID comprises information from a single component class of the hardware configuration.

At decision block 409, a decision is made as to whether the identification string of the single-instance class to be included in the header is subjected to a hashing function. The identification string may be included verbatim, subjected to a hash function and/or truncated to a desired number of bits.

If the identification string is to be subjected to a hash function, the method proceeds to step 411, wherein a hash function is performed on the identification string of the component instance. Desirably, the hash result is truncated to a length of about 16 bits. In step 412, the hash result is inputted into the truncated numerical portion 312 of header part 31 (as shown in FIG. 3). If the identification string is not subjected to a hash function, the method proceeds to step 410, where the identification string is truncated to a desired length and inputted into the truncated numerical portion 312 of header part 31. Desirably, the identification string is truncated to a length of less than about 16 bits.

Once a truncated hash result from step 412 or a truncated identification string from step 410 is inputted into truncated numerical portion 312 of header part 31, the method proceeds to decision block 413. At decision block 413, a decision is made whether to add details of another component class to header part 31 of the VHWID. If additional details of another component class are to be added to the header part 31 of the VHWID, the method returns to step 407 and proceeds as described above. If no further information is to be added to the header part 31 of the VHWID, the method proceeds to step 414, where the count portion 32 of the VHWID is prepared. As discussed above, the count portion 32 of the VHWID comprises a numerical string of n numbers, which represent the number of component instances within each of then component classes used to form the VHWID. (See count portion 32 of FIG. 3.)

In step 415, a hash function is performed on the identification strings for each component instance represented in the count portion 32 of the VHWID. If a given component class does not contain a component instance, a special hash result may be generated for use in the VHWID, wherein the special hash result indicates that a given component class did not contain a component instance. Alternatively, no hash value may be stored and the part of count potion 32 corresponding to the missing component class will be set to zero, indicating that the component class is absent. The hash results for each component instance may be truncated to a desired length. In one exemplary embodiment of the present invention, each of the hash function results are truncated to a length of from about 10 to about 20 bits, more desirably, about 16 bits.

Any known hash functions may be used in the present invention as long as the hash function is capable of accepting an identification string of arbitrary length and producing a hash output or result having a fixed length of less than or equal to about 160 bits. Examples of suitable hash functions include, but are not limited to, hash function algorithms HAVAL, MD2, MD4, MD5, and SHA-1, all of which are known to those of ordinary skill in the art. Other suitable hash functions for use in the present invention are disclosed in "Applied Cryptography" by Bruce Schneier, Published by John Wiley & Sons (ISBN #0471117099), the disclosure of which is hereby incorporated by reference in its entirety.

In one embodiment of the present invention, a "salt value" may be added to the component instance identifier prior to performing the hash function for a given component instance. In this embodiment, adding a salt value enables the production of different VHWIDs based on the same computer hardware configuration. Different VHWIDs for the same hardware configuration may be beneficial when running different applications or different passes. One example of a situation where different VHWIDs for the same hardware configuration may be beneficial is discussed below.

For example, if a user activates multiple software packages from the same vendor, it may be possible to use the VHWID torelate the separate activation records to build a picture of the software purchasing habits of the user. To guard against this, different VHWIDs from the same machine may be made to appear unrelated by constructing each separate hash using a hash function such as $hash_x=MD5[(salt\ value)_x+ID\ string]$ where the salt value is different for each software package.

In step 416, the hash results for each component instance are concatenated to form hash portion 33 of verbose hardware identification (VHWID) 34 as shown in FIG. 3. In step 217, the final verbose hardware identification (VHWID) 34 is assembled by concatenating header part 31, count part 32, and hash part 33.

In step 418, the resulting verbose hardware identification (VHWID) for hardware configuration HW1 is stored for future use. The verbose hardware identification (VHWID) for hardware configuration HW1 may be stored locally (e.g., in the registry, file system, or secure store) or at an accessible remote location (e.g., a database) or transmitted to a clearinghouse server for license acquisition.

As discussed above, in some embodiments of the present invention, the verbose hardware identification (VHWID) for hardware configuration HW1 may only contain (i) hash portion 33 or (ii) count part 32 in combination with hash portion 33, such as a VHWID comprising count part 32 concatenated with hash portion 33.

II. Using a Verbose Hardware Identification (VHWID) to Enable the Use of a Software Product on a Computer System The present invention is further directed to a method of using a verbose hardware identification (VHWID) to enable the use of a software product on a computer system having a given computer hardware configuration. In one embodiment of the present invention, the method of using a verbose hardware identification (VHWID) to enable the use of a software product on a computer system having a given computer hardware configuration is initiated (i) during any installation of the software product on a computer other than an initial installation, (ii) during launching of a software product or application already existing on a component of a computer hardware configuration, or (iii) both. An exemplary method for using the verbose hardware identification (VHWID) is described in FIG. 7. The steps of the exemplary method may be performed by software code within a software product on a customer's computer, similar to computer 20 described above with reference to FIG. 1.

Figure 7:
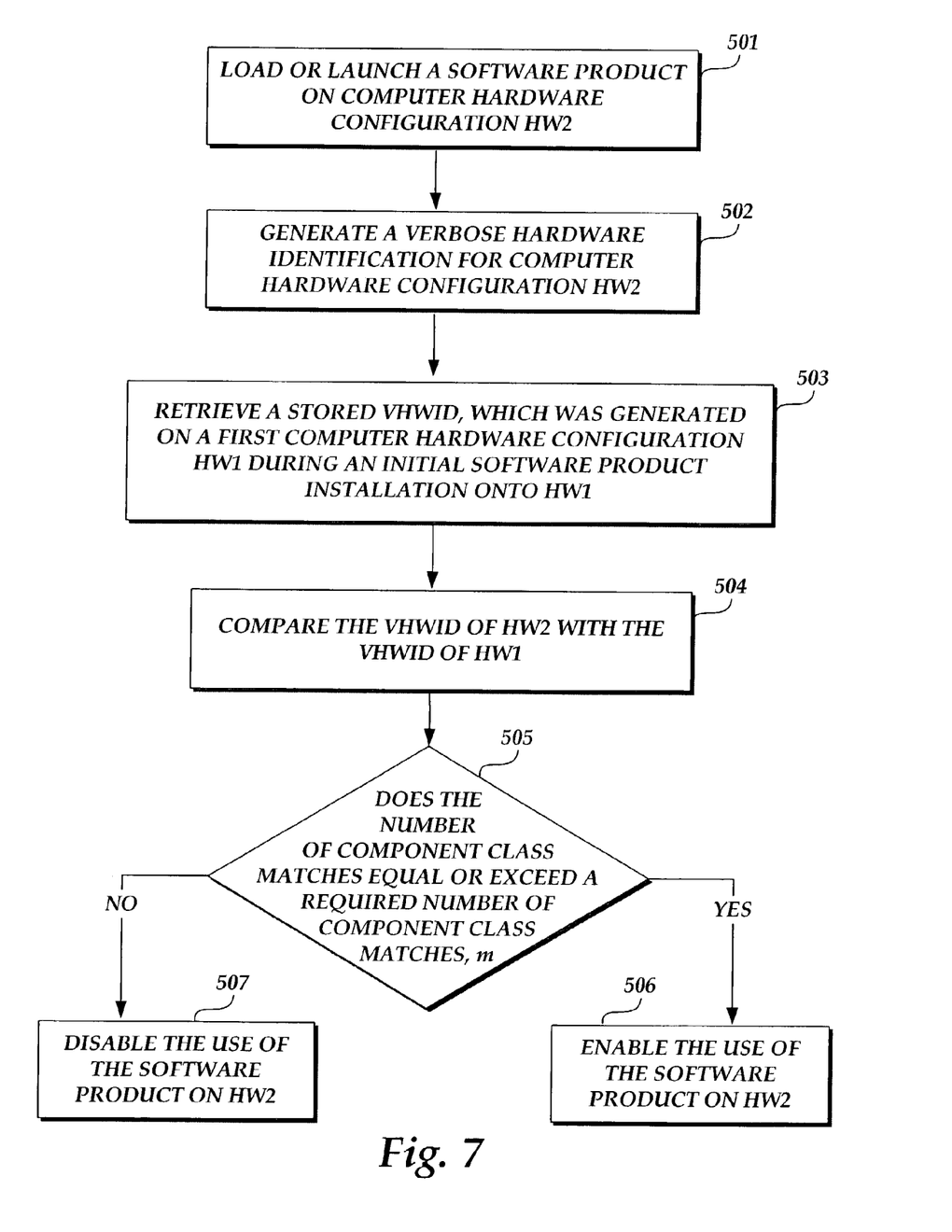
FIG. 7 is a flow diagram showing exemplary steps in determining whether a software product can be used on a computer hardware system by comparing a newly generated verbose hardware identification (VHWID) to a previously generated verbose hardware identification (VHWID).

As shown in step 501 of FIG. 7, a software product is either loaded or launched on a computer having hardware configuration HW2. Computer hardware configuration HW2 may be identical to hardware configuration HW1 used to produce an initial verbose hardware identification (referred to herein as iVHWID) or may be a completely different computer. In step 502, a new verbose hardware identification (referred to herein as nVHWID) is generated for computer hardware configuration HW2. The verbose hardware identification (nVHWID) for computer hardware configuration HW2 may be generated as described above and shown in FIGS. 4-6. Once a new verbose hardware identification (nVHWID) is generated for computer hardware configuration HW2, a stored verbose hardware identification (VHWID) is retrieved in step 503. Typically, the stored verbose hardware identification (VHWID) is the initial verbose hardware identification (iVHWID), which was generated on a first computer hardware configuration HW1 during, or soon after, an initial software product installation onto HW1.

In step 504, the new verbose hardware identification (nVHWID) of hardware configuration HW2 is compared with the initial verbose hardware identification (iVHWID) of hardware configuration HW1. The method proceeds to decision block 505. At decision block 505, a determination is made as to whether the number of component class matches equals or exceeds a required number of component class matches, m, needed to enable the use of the software product on hardware configuration HW2. If the number of component class matches equals or exceeds a required number of component class matches, m, the method proceeds to step 506, wherein the method enables the use of the software product on hardware configuration HW2. If the number of component class matches is less than the required number of component class matches, m, the method proceeds to step 507, wherein the method disables the use of the software product on hardware configuration HW2.

In step 504, the comparison of new verbose hardware identification (nVHWID) of hardware configuration HW2 with the initial verbose hardware identification (iVHWID) of hardware configuration HW1 may involve one or more rules for determining whether or not there is a match for a given component class. Desirably, the method of using a verbose hardware identification (VHWID) to enable the use of a software product comprises one or more of the following rules for determining the number of component class matches between a newly generated verbose hardware identification and a previously stored verbose hardware identification:

(i) each hash result within new verbose hardware identification (nVHWID) representing a component instance within a component class of hardware configuration HW2 is compared with each hash result within initial verbose hardware identification (iVHWID) representing the corresponding component class in hardware configuration HW1;

(ii) a match exist between a component class of hardware configuration HW2 and a corresponding component class of hardware configuration HW1 when one hash result within new verbose hardware identification (nVHWID) representing a component instance within the component class of hardware configuration HW2 matches any one of the hash results within initial verbose hardware identification (iVHWID) representing the corresponding component class in hardware configuration HW1;

(iii) a single match exist between a component class of hardware configuration HW2 and a corresponding component class of hardware configuration HW1 when two or more hash results within new verbose hardware identification (nVHWID) representing two or more component instances within the component class of hardware configuration HW2 matches two or more hash results within initial verbose hardware identification (iVHWID) representing the corresponding component class in hardware configuration HW1;

(iv) no matches exist between a component class of hardware configurations HW2 and a corresponding component class of hardware configuration HW1 when the component class in hardware configuration HW2 does not contain a component instance, and the corresponding component class in hardware configuration HW1 does contain a component instance;

(v) no match exists between a component class of hardware configuration HW2 and a corresponding component class of hardware configuration HW1 when the component class in hardware configuration hardware configuration HW2 contains a single component instance, and the corresponding component class in hardware configuration HW1 does not contain a component instance;

(vi) the number of required component classes matches, m, between hardware configuration HW2 and hardware configuration HW1 may be predetermined and embedded in code on a given software product.

The number of required component class matches, m, is chosen depending on the degree of tolerance desired for hardware configuration component changes. The number of required component class matches, m, may be as great as n, the total number of component classes considered during the determination of a verbose hardware identification (VHWID), or may be as small as 1. As m increases, the degree of tolerance to computer hardware configuration changes decreases. For example, if the total number of component classes n is equal to 10 and m is equal to 7, 7 out of 10 component classes must match at least one component instance to enable the loading or running of a software product. If the number of component class matches is less than 7, the software product will not run, be loaded, or be licensed to run on the computer hardware configuration.

The number of required component class matches, m, may be predetermined by a software manufacturer and encoded into the software product code used to generate a verbose hardware identification (VHWID). Desirably, m is equal to or greater than (n−3), more desirably, m is equal to or greater than (n−2). However, as indicated above, m may range from 1 to n.

The method steps described above and illustrated in FIGS. 4-6 and 7 may be performed locally or at a remote location. Typically, a customer purchases a software product that can run on a given computer, such as computer 20 shown in FIG. 1. The software product may be a shrink-wrap product having a software program stored on a transportable computer-readable medium, such as a CD-ROM or floppy diskette. Alternatively, the software product may be delivered electronically over a network, such as a local area network (LAN) 51 or a wide area network (WAN) 52. The customer loads the software product onto the computer 20 as a program stored in system memory 22.

During a software product installation, the customer is typically prompted to enter a portion of the software product identification (PID) for the software product into computer 20. The PID may be derived, for example, from a CD key printed on a label of the shrink-wrap package. The customer enters the PID, which is associated with a software program of the software product. The PID is stored locally on computer 20 and/or remotely at an accessible location, either on a local area network (LAN) 51 or a wide area network (WAN) 52 with a third party, such as an activation authority.

As described above, during installation or activation of the software product, a verbose hardware identification (VHWID) is also generated using code within the software product or triggered by the installation of the software product. The verbose hardware identification (VHWID) generated by the method of the present invention is associated with the software product identification (PID) and stored along with the software product identification (PID) locally on computer 20 and/or remotely at an accessible location, either on a local area network (LAN) 51 or a wide area network (WAN) 52, such as with a third party activation authority.

As part of the installation process, the customer may be required to activate the software product with an activation authority. This authority might be, for example, the product manufacturer or an authorized third party. The activation process is intended to force the customer to activate the software product (i) for installation and use on a specific computer or (ii) for installation and use according to terms of a product licensing agreement. Such an activation process is described in detail in U.S. Pat. No. 6,243,468, assigned to Microsoft Corporation (Redmond, Wash.), the contents of which are hereby incorporated in its entirety by reference.

The verbose hardware identification (VHWID) generated by the method of the present invention and the software product identification (PID) may be stored locally on computer 20 and/or remotely at an accessible location, either on a local area network (LAN) 51 or a wide area network (WAN) 52 with an activation authority. Desirably, the software product (i) stores both the verbose hardware identification (VHWID) and the associated software product identification (PID) on computer 20, and (ii) sends both the verbose hardware identification (VHWID) and the associated software product identification (PID) electronically over wide area network (WAN) 52 to an activation server. Desirably, the software product automatically displays a graphical user interface (UI) dialog window when it is first launched, which prompt the user to initiate a connection with the activation server to activate itself. The activation server maintains a database to store received verbose hardware identifications (VHWIDs) and their associated software product identifications (PIDs).

The verbose hardware identification (VHWID) and associated software product identification (PID) for a given software product may be stored for an indefinite period of time until the software product is re-installed onto another computer or launched on the first computer (i.e., the computer used during the initial installation). When the same software product is re-installed onto another computer or launched on the first computer, code on the software product initiates a method of generating a new verbose hardware identification (VHWID) according to the present invention. The software product also retrieves the previously stored verbose hardware identification (VHWID) associated with the software product identification (PID) of the software product either from local computer 20 or from a remote location via a local area network (LAN) 51 or a wide area network (WAN) 52. A comparison between the new verbose hardware identification (VHWID) and the previously stored verbose hardware identification (VHWID) is made as described above.

When the use of a software product is denied due to significant changes in the hardware configuration of a first computer (i.e., the computer used during the initial installation), a dialog box may be provided to the customer indicating that the use of the software product is being denied, and that further information regarding future use of the software product may be obtained from a given source.

III. Other Uses of a Verbose Hardware Identification (VHWID)

The verbose hardware identification (VHWID) of the present invention may also be used for other purposes than those described above. In one embodiment of the present invention, the verbose hardware identification (VHWID) is used to create semi-unique installation ID to track the machine. In another embodiment of the present invention, the verbose hardware identification (VHWID) is used on a clearinghouse server when granting licenses to use software on a customer's computer.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of generating a verbose hardware identification (VHWID) for a first computer system having a first hardware configuration, wherein the method comprises:
    selecting n component classes;
    identifying all component instances within each of the n component classes;
    generating a plurality of hash results, wherein the plurality of hash results comprises a hash result for each component instance and at least one hash result for the n component classes; and
    concatenating (i) a header portion, (ii) a count portion, and (iii) the plurality of hash results to form the verbose hardware identification (VHWID) for the first computer system.

2. The method of claim 1, wherein n is a whole number from 2 up to 16.

3. The method of claim 1, wherein the header portion comprises (a) a version number, and (b) one of (i) a hash result resulting from a step of performing a hash function on an identification string of a single-instance class, (ii) a truncated identification string for a single-instance class, and (iii) an identification string for a single-instance class.

4. The method of claim 3, wherein components (a) and (b) are concatenated to form the header portion.

5. The method of claim 1, wherein the header portion includes at least one member of a group comprising: (i) a hash result resulting from a step of performing a hash function on an identification string of a single-instance class, (ii) a truncated identification string for a single-instance class, and (iii) an identification string for a single-instance class.

6. The method of claim 1, wherein the count portion comprises a concatenated string of n numbers, wherein each number represents the number of component instances within the n component classes.

7. The method of claim 1, wherein at least one component class contains at least two component instances.

8. The method of claim 1, wherein each component class contains from 0 to 14 component instances.

9. The method of claim 3, wherein the hash result is truncated to a 16 bit number.

10. The method of claim 1, wherein the method is initiated during a step of loading a software product onto the first computer system.

11. A method of determining whether a software product can be used on a second computer system having a second hardware configuration, wherein the second computer system is identical to or different from the first computer system, wherein the method comprises:
    generating a second verbose hardware identification (sVHWID) for the second hardware configuration;
    comparing the second verbose hardware identification (sVHWID) for the second hardware configuration to a received verbose hardware identification (VHWID) for the first hardware configuration generated by the method of claim 1;
    loading the software product onto the second computer system when a number of matches exists between component classes of the second hardware configuration and corresponding component classes of the first hardware configuration, and the number of matches equals or exceeds m, a number of required component class matches, wherein no match exists between a component class of the second hardware configuration and a corresponding component class of the first hardware configuration when at least one member is true of the group comprising: (i) the component class in the first hardware configuration does not contain a component instance, and the corresponding component class in the second hardware configuration does contain a component instance, and (ii) the component class in the first hardware configuration contains a single component instance, and the corresponding component class in the second hardware configuration does not contain a component instance; and preventing the software product from being loaded onto the second computer system when the number of matches is less than m.

12. The method of claim 11, wherein a match exists between a component class of the second hardware configuration and a corresponding component class of the first hardware configuration when one hash result representing a component instance within the component class of the second hardware configuration matches any one of the hash results from the corresponding component class in the first hardware configuration.

13. The method of claim 11, wherein a single match exists between a component class of the second hardware configuration and a corresponding component class of the first hardware configuration when two or more hash results representing two or more component instances within the component class of the second hardware configuration matches two or more of the hash results from the corresponding component class in the first hardware configuration.

14. The method of claim 11, wherein m equals (n−3).

15. A computer readable storage medium having stored thereon computer-executable instructions for performing a method of generating a verbose hardware identification (VHWID) for a first computer system having a first hardware configuration, wherein the method comprises:

selecting n component classes;
identifying all component instances within each of the n component classes;
generating a plurality of hash results, wherein the plurality of hash results comprises a hash result for each component instance and at least one hash result for the n component classes; and
concatenating (i) a header portion, (ii) a count portion, and (iii) the plurality of hash results to form the verbose hardware identification (VHWID) for the first computer system.

16. The computer readable storage medium of claim 15, wherein n is a whole number from 2 up to 16.

17. The computer readable storage medium of claim 15, wherein the header portion comprises (a) a version number and (b) one of (i) a hash result resulting from a step of performing a hash function on an identification string of a single-instance class, (ii) a truncated identification string for a single-instance class, and (iii) an identification string for a single-instance class.

18. The computer readable storage medium of claim 17, wherein components (a) and (b) are concatenated to form the header portion.

19. The computer readable storage medium of claim 15, wherein the header portion includes at least one member of a group comprising: (i) a hash result resulting from a step of performing a hash function on an identification string of a single-instance class, (ii) a truncated identification string for a single-instance class, and (iii) an identification string for a single-instance class.

20. The computer readable storage medium of claim 15, wherein the count portion comprises a concatenated string of n numbers, wherein each number represents the number of component instances within the n component classes.

21. The computer readable storage medium of claim 15, wherein at least one component class contains at least two component instances.

22. The computer readable storage medium of claim 15, wherein each component class contains from 0 to 14 component instances.

23. The computer readable storage medium of claim 17, wherein the hash result is truncated to a 16 bit number.

24. The computer readable storage medium of claim 15, wherein the method is initiated during a step of loading a software product onto the first computer system.

25. A computer readable storage medium having stored thereon computer-executable instructions for performing a method of determining whether a software product can be used on a second computer system having a second hardware configuration, wherein the second computer system is identical to or different from the first computer system, wherein the method comprises:

generating a second verbose hardware identification (sVHWID) for the second hardware configuration;
comparing the second verbose hardware identification (sVHWID) for the second hardware configuration to the verbose hardware identification (VHWID) for the first hardware configuration generated by the method of claim 20;
loading the software product onto the second computer system when a number of matches exists between component classes of the second hardware configuration and corresponding component classes of the first hardware configuration, and the number of matches equals or exceeds m, a number of required component class matches, wherein no match exists between a component class of the second hardware configuration and a corresponding component class of the first hardware configuration when at least one member is true of the group comprising: (i) the component class in the first hardware configuration does not contain a component instance, and the corresponding component class in the second hardware configuration does contain a component instance, and (ii) the component class in the first hardware configuration contains a single component instance, and the corresponding component class in the second hardware configuration does not contain a component instance; and preventing the software product from being loaded onto the second computer system when the number of matches is less than m.

26. The computer readable storage medium of claim 25, wherein a match exists between a component class of the second hardware configuration and a corresponding component class of the first hardware configuration when one hash result representing a component instance within the component class of the second hardware configuration matches any one of the hash results from the corresponding component class in the first hardware configuration.

27. The computer readable storage medium of claim 25, wherein a single match exists between a component class of the second hardware configuration and a corresponding component class of the first hardware configuration when two or more hash results representing two or more component instances within the component class of the second hardware configuration matches two or more of the hash results from the corresponding component class in the first hardware configuration.

28. The computer readable storage medium of claim 25, wherein m equals (n–3).

29. A computing system for generating a verbose hardware identification (VHWID) for a first computer system having a first hardware configuration, the system comprising:
a processor;
a memory having computer-executable instructions stored thereon, wherein the computer-executable instructions are configured to:
select n component classes;
identify component instances within each of the n component classes;
generate a plurality of hash results, wherein the plurality of hash results comprises a hash result for each component instance and at least one hash result for the n component classes; and
concatenate (i) a header portion, (ii) a count portion, and (iii) the plurality of hash results to form the verbose hardware identification (VHWID) for the first computer system.

30. The computing system of claim 29, wherein n is a whole number from 2 up to 10.

31. The computing system of claim 29, wherein the header portion comprises (a) a version number and (b) one of (i) a hash result resulting from a step of performing a hash function on an identification string of a single-instance class, (ii) a truncated identification string for a single-instance class, and (iii) an identification string for a single-instance class.

32. The computing system of claim 31, wherein components (a), (b), and (c) are concatenated to form the header portion.

33. The computing system of claim 29, wherein the header portion includes at least one member of a group comprising: (i) a hash result resulting from a step of performing a hash function on an identification string of a single-instance class, (ii) a truncated identification string for a single-instance class, and (iii) an identification string for a single-instance class.

34. The computing system of claim 29, wherein the count portion comprises a concatenated string of n numbers, wherein each number represents the number of component instances within the n component classes.

35. The computing system of claim 29, wherein at least one component class contains at least two component instances.

36. The computing system of claim 29, wherein each component class contains from 0 to 14 component instances.

37. The computing system of claim 31, wherein the hash result is truncated to a 16 bit number.

38. The computing system of claim 29, wherein the method is initiated during a step of loading a software product onto the first computer system.

39. A computing system for determining whether a software product can be used on a second computer system having a second hardware configuration, wherein the second computer system is identical to or different from the first computer system, the system comprising:
a processor,
a memory having computer-executable instructions stored thereon, wherein the computer-executable instructions are configured to:
generate a second verbose hardware identification (sVHWID) for the second hardware configuration;
compare the second verbose hardware identification (sVHWID) for the second hardware configuration to the verbose hardware identification (VHWID) for the first hardware configuration generated by the method of claim 37;
load the software product onto the second computer system when a number of matches exists between component classes of the second hardware configuration and corresponding component classes of the first hardware configuration, and the number of matches equals or exceeds m, a number of required component class matches,
wherein no match exists between a component class of the second hardware configuration and a corresponding component class of the first hardware configuration when at least one member is true of the group comprising: (i) the component class in the first hardware configuration does not contain a component instance, and the corresponding component class in the second hardware configuration does contain a component instance, and (ii) the component class in the first hardware configuration contains a single component instance, and the corresponding component class in the second hardware configuration does not contain a component instance; and
prevent the software product from being loaded onto the second computer system when the number of matches is less than m.

40. The computing system of claim 39, wherein a match exists between a component class of the second hardware configuration and a corresponding component class of the first hardware configuration when one hash result representing a component instance within the component class of the second hardware configuration matches any one of the hash results from the corresponding component class in the first hardware configuration.

41. The computing system of claim 39, wherein a single match exists between a component class of the second hardware configuration and a corresponding component class of the first hardware configuration when two or more hash results representing two or more component instances within the component class of the second hardware configuration matches two or more of the hash results from the corresponding component class in the first hardware configuration.

42. The computing system of claim 39, wherein m equals (n–3).

43. A method of generating a verbose hardware identification (VHWID) for a first computer system having a first hardware configuration, wherein the method comprises:
selecting n component classes;
identifying component instances within each of the n component classes;
generating a plurality of hash results, wherein the plurality of hash results comprises a hash result for each component instance and at least one hash result for the n component classes, wherein each hash result is truncated to a 16 bit number; and concatenating the plurality of hash results to form a hash portion, wherein the hash portion forms the verbose hardware identification (VHWID) for the first computer system.

44. A computer readable storage medium having stored thereon computer-executable instructions for performing a method of generating a verbose hardware identification (VHWID) for a first computer system having a first hardware configuration, wherein the method comprises:

selecting n component classes;

identifying component instances within each of the n component classes;

generating a plurality of hash results, wherein the plurality of hash results comprises a hash result for each component instance and at least one hash result for the n component classes, wherein each hash result is truncated to a 16 bit number; and concatenating the plurality of hash results to form a hash portion, wherein the hash portion forms the verbose hardware identification (VHWID) for the first computer system.

45. A computing system for generating a verbose hardware identification (VHWID) for a first computer system having a first hardware configuration, the system comprising:

a processor;

a memory having computer-executable instructions stored thereon, wherein the computer-executable instructions are configured to:

select n component classes;

identify component instances within each of the n component classes;

generate a plurality of hash results, wherein the plurality of hash results comprises a hash result for each component instance and at least one hash result for the n component classes, wherein each hash result is truncated to a 16 bit number; and concatenate the plurality of hash results to form a hash portion, wherein the hash portion forms the verbose hardware identification (VHWID) for the first computer system.

* * * * *